United States Patent [19]
Cornell et al.
[11] 3,735,348
[45] May 22, 1973

[54] TAPE RECORDING EDITING SYSTEM

[75] Inventors: Clark Cornell, Pasadena; Gary J. Himler, Granada Hills; John F. Ahlstrom, Canago Park, all of Calif.

[73] Assignee: Legalprint, Lynwood, Calif.

[22] Filed: June 1, 1971

[21] Appl. No.: 148,333

[52] U.S. Cl. ..........340/146.1 R, 340/172.5
[51] Int. Cl. ..........G06k 5/00
[58] Field of Search ..........340/172.5, 146.1, 340/324 A; 235/153

[56] References Cited

UNITED STATES PATENTS

| | | | |
|---|---|---|---|
| 3,248,705 | 4/1966 | Dammann et al. | 340/172.5 |
| 3,364,473 | 1/1968 | Reitz et al. | 340/172.5 |
| 3,382,487 | 5/1968 | Sharon et al. | 340/172.5 |
| 3,559,181 | 1/1971 | Carlock et al. | 340/172.5 |
| 3,501,746 | 3/1970 | Vosbury | 340/172.5 |
| 3,579,196 | 5/1971 | Gregg et al. | 340/172.5 |
| 3,613,078 | 10/1971 | Manning et al. | 340/146.1 |

*Primary Examiner*—Charles E. Atkinson
*Attorney*—Jackson & Jones

[57] ABSTRACT

A system for editing records is disclosed. The system generally includes a pair of editing terminals each including a display console having a display screen, a data memory and a keyboard which is operatively connected to allow access to the data memory and to enable characters to be displayed on the screen. Also included at each of the terminals is a data transfer subsystem and a tape deck for a pair of tape cassettes, employed as a read cassette and a write cassette. The data transfer subsystem includes a manually operated control panel and essentially functions to allow tape recorded data to be transferred from the read casette to the data memory and stored data to be transferred from the data memory to the write cassette. The editing terminals are connected to allow intercommunication.

23 Claims, 5 Drawing Figures

TAPE RECORDING EDITING SYSTEM

BACKGROUND OF THE INVENTION

1. Field of the Invention

This invention generally relates to an editing system that enables tape records to be edited and an updated tape recording prepared. More particularly, the present invention concerns an editing system that may be used in the printing industry for editing a file, prior to any final printing, for the purpose of detecting and correcting errors and/or effecting last minute changes to the file.

2. Description of the Prior Art

In the field of financial and/or legal printing, a document to be printed, such as a prospectus, a legal brief, etc., is typically submitted to the printer at the latest possible time. The result is that the printer is required to perform a difficult task after usually little or no notice and under rush conditions which may easily contribute to the incidence of errors. Editing may involve the correcting of printing errors such as misspelling, etc. However, changes to the text are oftentimes required. A fast, simple, inexpensive and reliable editing system is thus required for any printing operation.

Generally considered, printing may be accomplished in two fashions. The long standing technique involves the use of metal type forms while the newer technique, sometimes referred to as a cold type system, essentially involves computer printing. In the first technique, metal type forms are fabricated through the use of type setting machines. Changes when necessary, require the removal of particular type forms and the substitution of a desired type form therefor. While the use of metal type forms may today be considered to be cumbersome and relatively slow, the technique has nevertheless endured due to the reliability provided by the integrity of the metal record, once set.

The newer printing techniques using a cold type system are generally considerably faster than the long standing technique of using metal forms. Such cold type systems, however, typically involve the use of a computer wherein a file to be printed is read into and out of the computer memory. The computer may be programmed to allow textual changes to be made during read-out. Where a great number of changes are to be made and some of these changes are substantial such as, for example, the deletion, addition and/or juggling of paragraphs, editing instructions may become extraordinarily complex, time consuming, expensive, and prone to error. Nevertheless, the technique of computer printing has been found to be acceptable despite the attendant disadvantages. The cost, efficiency, and reliability of cold type systems, however, may be greatly enhanced by the availability of a simple, fast, inexpensive and accurate editing system.

It is thus the intention of the present invention to present a tape record editing system which significantly reduces the expense and complexity of the editing process used with prior art cold type systems and which at the same time provides the file integrity that is characteristic of metal type form techniques.

SUMMARY OF THE INVENTION

Briefly described, the present invention involves a technique and apparatus that enables tape records to be edited in a fashion wherein an updated edited tape is continually prepared during the process of editing such that a high degree of file integrity is provided.

More particularly, the subject tape recording editing system includes a pair of editing terminals each of which includes a display console including a display screen, a data storage, and a keyboard having access to the data storage and to the display screen. Also included in each editing terminal is a data transfer subsystem and a tape handling device for accommodating a read tape cassette and a write tape cassette. The data transfer subsystem, which includes a tape control panel, operates to enable recorded data to be transferred from the read tape cassette to the display console for storage and/or display and enable edited data to be retransferred to the write tape cassette for recordation as an updated and edited file. In addition to the tape control panel, the data transfer subsystem includes a read channel and a write channel each having a buffer and format control circuitry which are operatively connected to the display console through a bank of routing gates. The read channel may further include an error detection loop and a block counter. The write channel may further include a redundancy control circuit. Companion editing terminals are linked through the respective data transfer subsystems thereof to allow communication between the editing terminals.

The features that characterize the novelty of the present invention are set forth with particularity in the appended claims. Both the organization and manner of operation of the invention, as well as the objects and attendant advantages thereof may be best understood by reference to the following detailed description taken in conjunction with the accompanying drawings wherein like reference symbols designate like parts throughout the figures thereof.

DESCRIPTION OF THE PREFERRED EMBODIMENT

Figure 1:
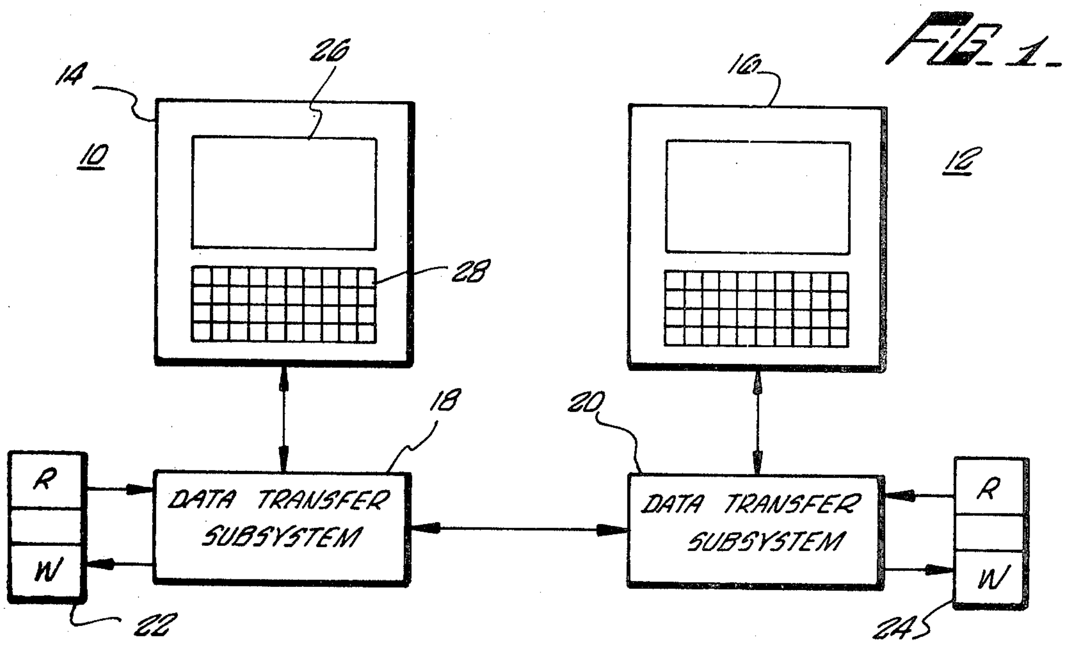
FIG. 1 is a schematic diagram illustrating a preferred embodiment of the present invention.

Referring to FIG. 1, an editing tape system in accordance with the present invention includes a pair of companion editing terminals 10 and 12. As illustrated, these editing terminals 10 and 12, respectively, include display consoles 14 and 16, data transfer subsystems 18 and 20 and tape handling devices 22 and 24 which are capable of accommodating tape recordings such as may be stored in conventional tape cassettes. Each of the tape handling devices 22 and 24 are adapted to handle a pair of tape cassettes. One of the pair serves an an input, or read, cassette and the other is used as an output, or write, cassette.

The display consoles 14 and 16 are each adapted to have a display screen 26, a keyboard 28, and a data memory (not shown). The display screen 26 serves to controllably display all or portions of the data memory contents. The data memory stores data characters applied to the display consoles 14 and 16 from the input tape cassette, through operation of a keyboard 28 at the editing terminal, or controllably from the companion editing terminal when properly linked. Typically, a data memory may have a capacity of two thousand characters. The keyboard 28 allows manual changes to be made in the stored data. Changes may also be made by simply inserting new data from an input tape. Any changes that are made in the stored data may be simultaneously displayed on the display screen 26, the displayed characters being identical to that which is stored in the data memory of the data console.

A data console that is considered suitable for use in connection with the present invention would be the TelTerm Video Display Terminal, made available by Delta Data Systems of Cornwells Heights, Pennsylvania. The specific details of the operation, such as standard data codes, coded instructions, input/output connections, clock pulse requirements, etc. of the TelTerm Video Display Terminals is described in *Users Manual for TelTerm Family of Video Display Terminals*, dated July 1970. Accordingly, further specific details of the display consoles 14 and 16 will not hereinafter be provided except to the extent necessary to clarify the relationships therewith of the data transfer subsystems 18 and 20 and the tape handling devices 22 and 24.

The tape handling devices 22 and 24 may each include any of the well known types of conventional tape cassette record players and/or recorders, singly or in combination. The tape player would accommodate the input or read tape cassette while the tape recorder would be used for the output or write tape cassette. It is to be understood that tape recordings of other conventional types, i.e., cartridges, reels, etc., may be used as well as cassettes and may be readily substituted therefor.

Data transfer subsystems 18 and 20, respectively operate to apply recorded data from the input or read cassettes to the display consoles 14 and 16 for storage in the data memory thereof such that the recorded data may undergo the desired editing. The data transfer subsystems 18 and 20 also operate to allow data stored in the console data memory to be transferred to the write cassettes for the purpose of preparing an updated tape recording including all of the changes made in the course of editing. By the preparation of the updated tape, while the editing process is being conducted, a high degree of tape integrity is maintained. The data transfer subsystems 18 and 20 further operate to link the companion editing terminals 10 and 12 to enable communication between terminals, i.e., the keyboard of the display console 14 may be operated to apply data to the screen and data memory of the console 16, and vice versa.

As earlier mentioned, the data memory of a display console may typically have a capacity in the neighborhood of 2,000 characters. The display screen may accommodate a data block with a total of 27 lines of data characters, each line having a maximum of eighty characters, for a maximum total of 2160 characters. Accordingly, all of the data stored in a memory may be displayed on a display screen of a console. Without doubt, most documents to be printed will exceed 2,000 characters. The data as such may be applied to the data console for storage, display, and editing in increments of 2,000 characters or less. Clearly, if a larger amount of data were capable of being accommodated by the data memory, and the display screen of a display console, data could be edited in larger increments. Using the exemplary capacities, an editing operation may involve successive increments of two thousand characters being applied from the read cassette to the data console, being edited, and then re-recorded on the write tape cassette. This process would be repeated with successive increments of data, forming a complete data "file" until the entire file of one or more read tape cassettes has been edited. At the end of the editing process, an updated file would be available in the write tape cassettes. The old read tapes could then be destroyed, erased, etc. As with the use of metal type form, the present system thus provides a high level of file integrity by always having available a tape record that is complete and accurate as recorded, and which, upon the commencement of printing, may be simply submitted to the printing procedure without the need for any further data manipulation, or the like, by a computer, etc. Since the editing process is performed completely independently of a computer that may be used to accomplish the printing process, no computer time is involved in the editing process or in the preparation of the finally edited tape recording. Considerable expense is thus saved by limiting the use of computer time to printing and by enabling the use of ordinarily skilled persons, without special computer training, for performing the editing.

Figure 2:
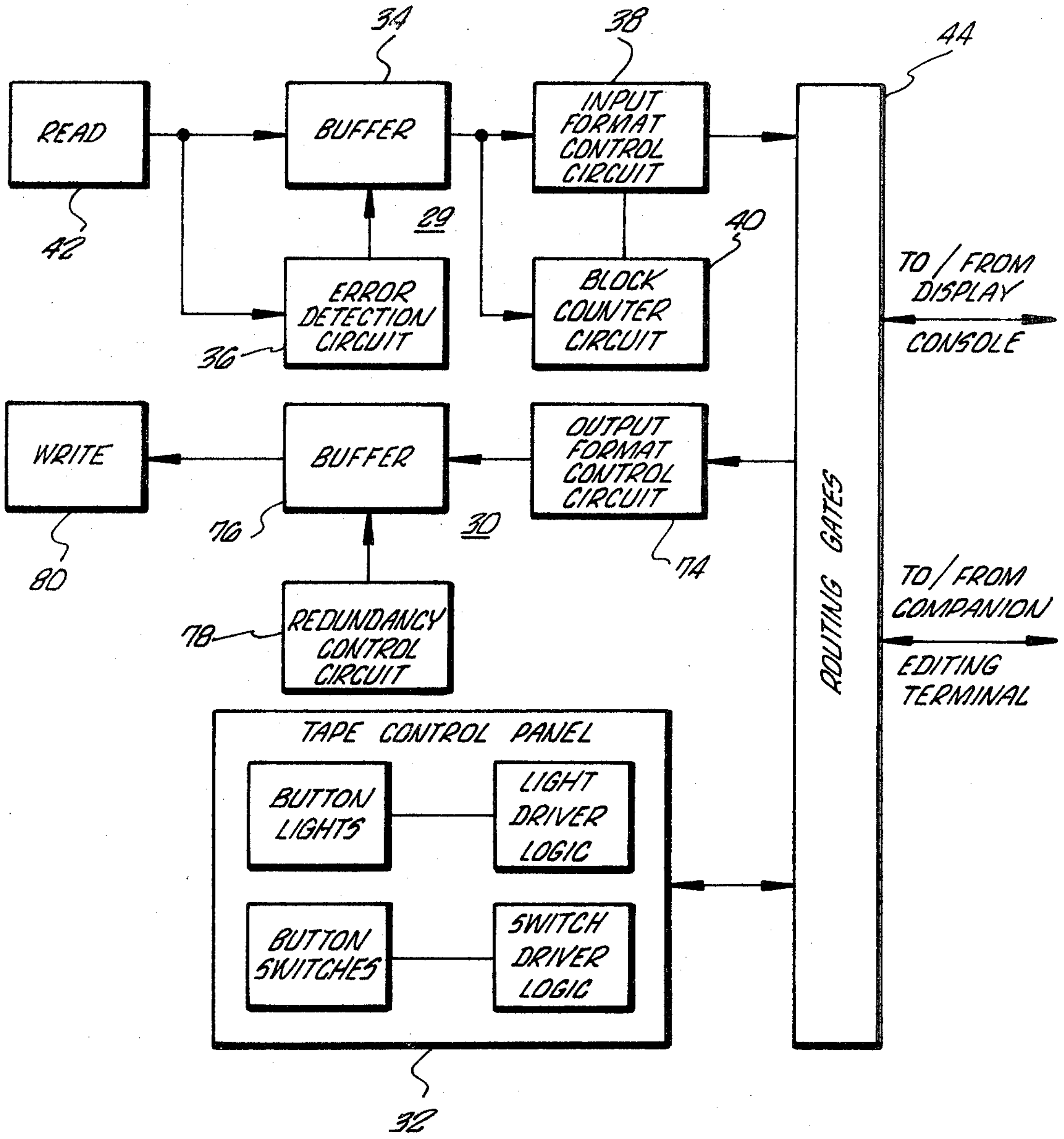
FIG. 2 is a schematic block diagram illustrating a data transfer subsystem that is suitable for use with the system of the present invention.

Referring to the data transfer subsystem 18 as exemplary, with reference to FIG. 2, a data transfer subsystem essentially includes a read channel 29, a write channel 30, and a tape control panel 32. As shown, the read channel 29 includes a buffer 34, an error detection circuit 36, and input format control circuit 38, and a block counter circuit 40. Data is applied from a read cassette 42 to both the buffer 34 and the error detection circuit 36 which serves to detect transmission errors between the tape handling device 22 and the buffer 34. Upon the detection of an error, an error signal may be provided to effect a desired control function as is discussed hereinafter. The contents of the buffer 34 is applied to the input format control circuit 38 and to the block counter circuit 40 for subsequent application to the console through an array of routing gates 44.

The buffer 34 may be of any type well known in the prior art. The data recorded on the read cassette may be in a form wherein each character is represented by a binary word including 11 bits of which the first bit is a start bit, and the next seven bits are character bits, followed by a data parity bit and two stop bits as has been standardized as the United States of America Standard Code for Information Interchange (USASCII). Under the USASCII, shorter binary words may be used. For convenience of operation, data characters from an input tape cassette may be transferred by "groups" of characters, the groups having any length or size as, for example, 64 characters. A two thousand character data memory in the console would then accommodate approximately 31 "groups" of characters. These groups of characters may be serially transferred through the buffer 34.

Figure 3:
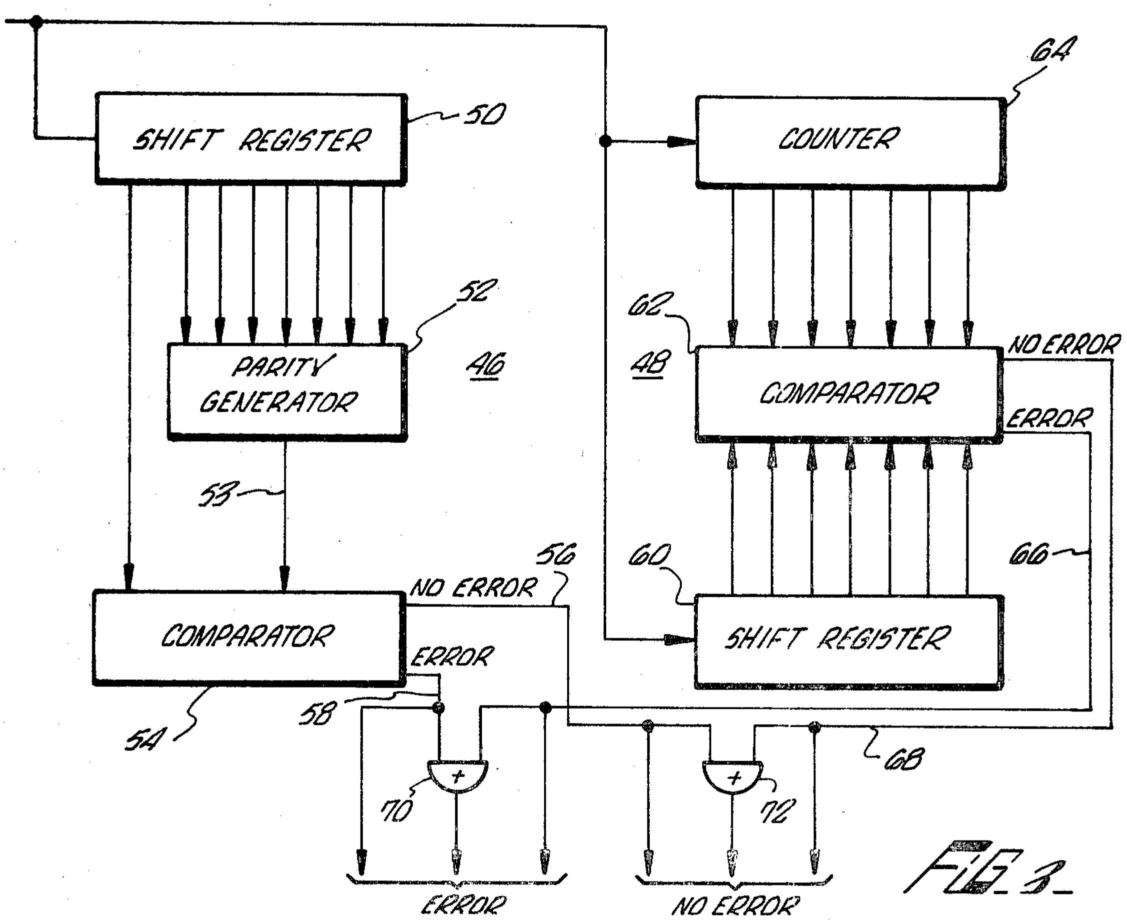
FIG. 3 is a schematic block diagram of an error detection circuit that may be employed in conjunction with the data transfer subsystem illustrated by FIG. 2.

The error detection circuit 36 is adapted to check each of the characters and also each of the groups of characters. Referring to FIG. 3, the error check for each character will be performed by a character check circuit 46 while the error check for each group is performed by a group check circuit 48. As shown, the character check circuit may include a shift register 50, a parity bit generator 52 and a comparator 54. As earlier mentioned, the parity bit may be included as the eighth data bit in each binary word representing a character and may be formed by simply adding the binary 1's included in a seven bit binary word corresponding to a particular character. For example, if the seven data bits of the binary word were to include two 1 bits, the parity bit could be a binary 0, whereas if three 1 bits were present, the parity bit would be a binary 1. As each binary word representing a character is then serially applied to the buffer 34 and also applied to the shift register 50, the parity generator 52 would then operate to generate a parity bit for each binary word applied to the shift register 50. If the parity bit generated by the parity generator 52, and provided over a lead 53, were to favorably compare with the parity bit accompanying each seven bit binary word, the comparator 54 would operate to provide an "error free" signal over a lead 56. An unfavorable comparison of the parity bits would result in an "error" signal being provided over a lead 58.

The parity generator 52 may be of any conventional type such as, for example, a binary adder. Similarly, the comparator 54 may be of any well known variety. It is to be, of course, understood that an appropriate clock signal is available for timing purposes as is well known in the prior art.

The group error check is performed by the group check circuit 48, as earlier mentioned. Where a "group" is chosen to include 64 characters and hence 64 binary words, a longitudinal redundancy check character (LRCC) may be formed by simply counting the binary 1's or 0's in a group. The LRCC may be included as a 65th character with each group. For example, if the first 64 characters of a record were to include 99 1's, the LRCC would be 99 and would be expressed binarily as 1100011. This LRCC is applied to a shift register 60, the outputs of which are applied to a comparator 62 to be compared with the contents of a counter 64. The counter 64 may be of any conventional type adapted to be incremented by the application thereto of binary 1 bits. Like the comparators 54, the comparator 62 is adapted to provide an error signal over a lead 66 when the comparison is unfavorable, and an error free signal over an output lead 68 whenever the comparison is favorable.

The error output leads 58 and 66 of the respective comparators 54 and 62 may be applied to an OR gate 70 for application to the display console which may be appropriately programmed to display a questionmark, or the like, with any character or group of characters for which an error has been detected by the respective check circuits 46 and 48. The error free signals provided over the output leads 56 and 68, of the respective comparators 54 and 62, and provided through an OR gate 72, may be used to perform some other control function of any suitable type such as enabling the transfer of data through the read channel 28.

The input format control circuit 38 may be of any conventional configuration typically including NAND gates and flip-flops. The format control circuit 38 essentially operates to provide instruction words to the tape reading apparatus 22, and to the display console 14, in accordance with pre-programmed instructions dictated by, for example, the characteristics of the display console 14. The format control circuit 38 may also serve to recognize pre-timed periods during which data can be transferred to and from the data memory of the display console. The format control circuit 38 thus essentially performs a "hard-wired" recognition and reaction control function that is characteristic of nearly all data processing systems. For example, the hard-wired control functions required for interface with a Tel Term Video Display Terminal is described in detail in Chapter 8 of the earlier identified Users' Manual for such display terminal. It is to be understood that other commercially available display terminals are available and would of course require a format control circuit that satisfies its own dialogue of control signals for communication with peripheral equipment.

The block counter circuit 40 serves to detect when the capacity of the data memory of the display console 14 has been reached or when the capacity of the display screen of the console has been reached. Assuming that the latter is to be detected, the block counter circuit 40 may simply be a counter of any conventional type which will count the number of lines of data transmitted to the console. This can be done by, for example, counting the "end of line" or "carriage return" characters. When the 27th or last line has been detected, the block control circuit 40 may operate to disable the tape read mechanism such that the data transfer to the console is temporarily halted until a further read instruction is received.

The routing gates 44 may simply be an array of NAND gates, or the like, which are appropriately ganged and connected to the respective input/output terminals of the display console 14. These terminals and the suggested routing gate impedances, voltages, etc., are described in detail in the earlier mentioned "Users Manual".

The write channel 30 essentially includes an output format control circuit 74, a buffer 76, and a redundancy control circuit 78. Edited portions of a file are transferred through the write channel 30 to a write tape cassette 80, for recordation, to prepare the desired updated tape recording. Upon completion of a writing operation, the data memory of the console 14 would typically be empty and ready for the next successive block of characters.

The output format control circuit 74 may be like the format control circuit 38 and functions to recognize instruction or command signals from the display console 14, and/or the tape control panel 32, and respond by, for example, enabling the transfer of data through the write channel 30. The routing gates 44 serve to appropriately connect the output format control circuit 74 to the display console 14 in accordance with the characteristics of the console 14 and the manufacturer's specifications.

The buffer 76 is like the buffer 34 and serves to apply the edited groups of characters to the tape handling device 22 for recordation on the write or output tape 80.

The buffer 76 as well as the buffer 34 may be of any convenient size and thereby accommodate a desired number of characters. Where groups of characters are to be recorded redundantly, then the buffers may be large enough to accommodate at least 65 characters (64 data characters plus the LRCC).

The redundancy control circuit 78 would detect the end of each group and re-initiate a transfer of the contents of the buffer 76 for a desired number of cycles before resetting the buffer. As such, the redundancy control circuit 78 may be a counter, or the like that is adapted to count "end of group" characters, parity bits, etc.

Figure 4:
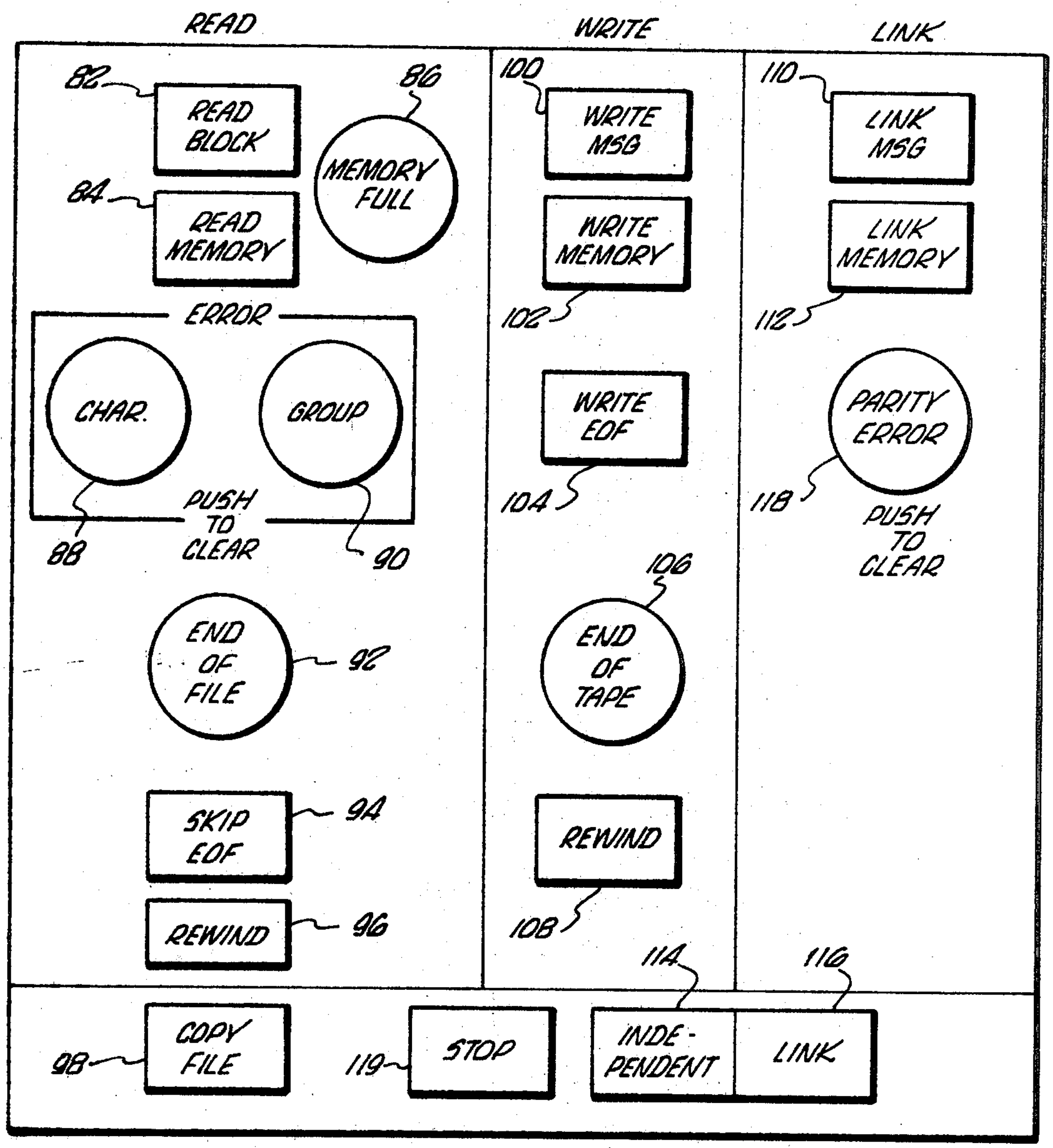
FIG. 4 is a schematic diagram illustrating a functional configuration for buttons and lights that may be provided on a tape control panel in accordance with the present invention.

The tape control panel 32 may be any configuration of lights and switching devices through which a user may effect control over the system. Naturally, a control panel may take any number of different appearances. However, FIG. 4 illustrates a functional configuration for a control panel 32.

For a read operation, a combination of six switches and four light indicators may be used. As shown in FIG. 4, a READ BLOCK switch 82 may enable a block of data to be read from the input or read tape 42 and entered into the data memory of the console 14. As an alternative, a READ MEMORY switch 84 is provided to enable a number of data characters sufficient to fill a data memory.

A MEMORY FULL light 86 may be provided to give the operator a visual indication when the data memory is full. The light 86 may be connected to become illuminated when the memory becomes full during reading of a tape or operation of the keyboard.

The error signals provided by the error detection circuits 46 and 48 may be respectively adapted to illuminate the lights of a CHARACTER ERROR switch 88 and a GROUP ERROR switch 90. A depression of these buttons when either is illuminated may operate to close an error condition whenever the error signals are used to halt the transfer of data as earlier explained. The operator as such can re-initiate the transfer of data upon clearing an error condition.

An END OF FILE (EOF) light 92 may be provided to indicate that such a condition has been reached. As earlier explained, a file may include any number of groups necessary to complete a document. The system may be programmed to be automatically halted by this condition. A SKIP EOF switch 94 may be provided to enable the operator to cause the system to continue operating regardless of an EOF signal being appropriately recognized, such as by the input format control circuit 38. Depression of the SKIP EOF switch 94 would extinguish the END OF FILE light 92 and allow a continuance of normal system operation. A REWIND switch 96 is provided to enable the input tape 42 to be rewound.

A COPY FILE switch 98 may be provided to enable a read or input tape to be copied directly onto the write or output tape without any display of the characters being copied. Detection of a character error or a group error may result in illumination of the error light for the switches 88 or 90. An operator may then cause the characters to be displayed by depressing the READ BLOCK switch 82 to enable visual detection of an error designated by a question mark. After correcting the error through the use of the keyboard 28, the operator may extinguish the error light and re-initiate the copying operation.

A write operation may be controlled by four switches and one light indicator. A WRITE MESSAGE switch 100, when depressed may cause a block, or display screen, full of characters to be recorded on the output tape 80. Similarly, a WRITE MEMORY switch 102 may be provided to cause the entire contents of a data memory to be recorded. A WRITE EOF switch 104 is provided to have the contents of the output buffer 76 emptied onto the write tape for recordation, and an end-of-file character to be written on the tape. An END OF TAPE light 106 may be used to indicate that the end of a tape has been reached. Another REWIND switch 108 may be provided to control rewinding of the write or output tape 80.

Linked operation of the companion editing terminals 10 and 12 may be accommodated by a pair of switches 110 and 112, which are respectively labeled LINK MSG and LINK MEMORY and by a pair of mode switches 114 and 116 respectively labelled INDEPENDENT and LINK. When the INDEPENDENT switch 114 is depressed, the operation described in the foregoing discussion can be carried on at only the individual editing terminals 10 and 12. When the LINK switches 116 of both terminals are depressed, the companion editing terminals 10 and 12 may be operated in concert. The switches 110 and 112 would then serve to allow either terminal to transmit data into the data memory of the companion terminal. Another indicator light 118 may be provided to indicate at the receiving terminal that an error has been detected by the transfer subsystem of the transmitting terminal.

System operation may be halted with a STOP switch 119.

Figure 5:
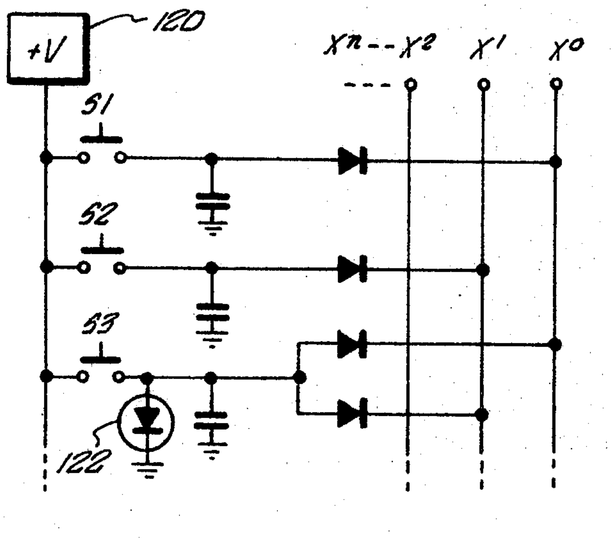
FIG. 5 is a schematic diagram illustrating a conventional switching circuit that may be employed in conjunction with the tape control panel.

The switches and lights on a control panel may assume any conventional configuration well known in the prior art. For example, as shown by FIG. 5, the switches 88, 90, 92, etc. may be selectively coupled to different combinations of output lines which each correspond to a different bit of a binary instruction word. Depression of the switch would then develop a recognizable high signal at only selected output lines. By way of example, a switch S3 when depressed would connect a voltage source 120 to output lines $X^0$ and $X^1$ which may be taken to develop a binary word 011. Obviously, if seven bit binary words are employed, then seven output lines would be used. A light emitting diode 122 may be used to illuminate the switch S3 when depressed.

From the foregoing discussion, it is now apparent that the present invention provides an editing system wherein each of two editing terminals 10 and 12 may be independently used at physically separated locations when in an INDEPENDENT mode or used in concert when in a LINK mode for the purpose of editing a tape recording. The tape may be of the magnetic, paper or any other conventional type, regardless of housing.

While a preferred embodiment of the present invention has been described hereinabove, it is intended that all matter contained in the above description and shown in the accompanying drawings be interpreted as illustrative, and not in a limiting sense, and that all modifications, constructions, and arrangements which fall within the scope and spirit of the present invention may be made.

What is claimed is:

1. A system for editing the contents of a tape recording to permit alteration of said contents if desired, and a shift register to which character bits are serially applied, said shift register having a plurality of output terminals for outputting said character bits; and check parity generator means for summing the character bits provided from said shift register to provide a check parity bit.

10. The apparatus defined by claim 7 wherein said predetermined increments of recorded data include a selected number of multibit binary words representing data characters, each binary word including a selected number of binary bits having either of two binary levels, a recorded increment parity bit accompanying each said predetermined increment, said second means including:

means for providing a check increment parity bit by counting the number of binary bits in a predetermined increment having a selected one of said two binary levels;

means for comparing said recorded increment parity bit to said check increment parity bit, an increment error signal being provided in response to an unfavorable comparison.

11. The apparatus defined by claim 9 wherein said predetermined increments include a selected number of said binary words, each bit forming said binary words having either of two binary levels, a recorded increment parity bit being provided for each of said predetermined increments, said second means including:

means for providing a check increment parity bit by counting the number of bits included in each said predetermined increment and having a selected one of said two binary levels; and means for comparing said recorded increment parity bit to said check increment parity bit, an increment error signal being provided in response to an unfavorable comparison.

12. The apparatus defined by claim 11, said control panel means including means responsive to said character error signals and said increment error signals for providing an indication that an error is present, said console means being controlled to display a visual error indicator.

13. The apparatus defined by claim 12 wherein said console means includes:

memory means for storing recorded data read from said input tape;

display means for displaying all or portions of data stored in said memory means; and keyboard means for controlling the display of said data stored in said memory means on said display means, said keyboard means enabling the alteration of said data stored in said memory means.

14. The apparatus defined by claim 13 wherein said tape handling means includes:

read means for detecting said recorded data from said input tape; and record means for recording data on said output tape, recorded data being provided from said input tape, edited data being provided from said console means.

15. In a system for editing data recorded on a tape, said data formed by a plurality of data characters each recorded as a multibit binary word, the system including a tape handling device for handling an input tape from which recorded data is read and an output tape on which edited data is recorded, and an editing console having a memory to which recorded data may be transferred for storage, a keyboard for altering data stored in said memory, and a display device for displaying data stored in said memory, a data transfer circuit including:

a read channel for transferring predetermined increments of recorded data read from an input tape;

a write channel for transferring data to said output tape for recordation wherein said write channel includes:

a write buffer for temporarily storing data transferred to said output tape for recordation, and redundancy means for controlling said recordation of data stored in said write buffer to be repeated a selected number of times; and control means for controlling the transfer of data through said read channel and said write channel.

16. In a system for editing data recorded on a tape, said data formed by a plurality of data characters each recorded as a multibit binary word, the system including a tape handling device for handling an input tape from which recorded data is read and an output tape on which edited data is recorded, and an editing console having a memory to which recorded data may be transferred for storage, a keyboard for altering data stored in said memory, and a display device for displaying data stored in said memory, a data transfer circuit including:

a read channel for transferring predetermined increments of recorded data from an input tape wherein said read channel includes:

a read buffer for temporarily storing data transferred from said input tape;

detector means for detecting errors in said data transferred through said read channel; and incrementing means for controlling the transfer of data through said read channel to be in predetermined increments;

a write channel for transferring data to said output tape for recordation; and control means for controlling the transfer of data through said read channel and said write channel.

17. The apparatus defined by claim 16 wherein said detector means includes:

a character detector circuit for detecting errors in the transfer of each of said binary words, a character error signal being provided; and an increment detector circuit for detecting errors in the transfer of each said predetermined increment of data characters, an increment error signal being provided.

18. The apparatus defined by claim 17 wherein said predetermined increments each include a selected number of said multibit binary words, said bits having one of two binary levels, each said predetermined increment having associated therewith a recorded increment parity bit, said increment detector circuit including:

means for counting the number of bits having a selected one of said two binary levels and forming the binary words included in said predetermined increments, a check increment parity bit being provided; and means for comparing said check increment parity bit to said recorded increment parity bit, an increment error signal being provided as a result of an unfavorable comparison.

19. The apparatus defined by claim 17 wherein said multibit binary words include a plurality of bits each having one of two binary levels, said bits forming a bifor recording an edited tape including any alterations to said contents, said system comprising:

tape handling means for controllably reading recorded data from an input tape and recording edited data on an output tape;

console means for enabling examination and editing of said recorded data read from said input tape; and transfer means for controlling the transfer of data between said console means and said tape handling means, said data being transferred by predetermined increments, said transfer means including:

a read channel for transferring recorded data read from said input tape to said console means or to said output tape;

a write channel for transferring edited data from said console means or recorded data from said input tape to said output tape for recordation thereon wherein said write channel includes:

a buffer connected to temporarily store recorded data from said input tape, or edited data from said console means, for transfer to said tape handling means for recordation on said output tape; and redundancy control means operatively connected to said buffer for controlling the transfer of data temporarily stored in said buffer to said tape handling means, said transfer being repeated a selected number of times to produce redundant recordation of data on said output tape; and control panel means for controlling the transfer of data between said input tape, said console means, and said output tape.

2. The apparatus defined by claim 1 wherein said console means includes:

memory means for storing recorded data read from said input tape;

display means for displaying all or portions of data stored in said memory means; and keyboard means for controlling the display of said data stored in said memory means on said display means, said keyboard means enabling the alteration of said data stored in said memory means.

3. The apparatus defined by claim 1 wherein said tape handling means includes:

read means for reading said recorded data from said input tape; and record means for recording data on said output tape, recorded data being provided from said input tape, edited data being provided from said console means.

4. The apparatus defined by claim 3 wherein said input tape and said output tape are housed in cassettes, said read means and said record means being adapted to accommodate cassettes.

5. The apparatus defined by claim 1 wherein said read channel includes:

a buffer connected to receive recorded data from said input tape;

error detection means for detecting the presence of errors in the transfer of recorded data from said input tape, an error signal being provided; and means for controlling the size of said predetermined increments of recorded data continually transferred through said read channel.

6. A system for editing the contents of a tape recording to permit alteration of said contents if desired, and for recording an edited tape including any alterations to said contents, said system comprising:

tape handling means for controllably reading recorded data from an input tape and recording edited data on an output tape;

console means for enabling examination and editing of said recorded data read from said input tape; and transfer means for controlling the transfer of data between said console means and said tape handling means, said data being transferred by predetermined increments, said transfer means including:

a read channel for transferring recorded data read from said input tape to said console means or to said output tape, said read channel including:

a first buffer connected to receive recorded data from said input tape;

error detection means for detecting the presence of errors in the transfer of recorded data from said input tape, error signals being provided; and means for controlling the size of said predetermined increments of recorded data permitted to be transferred from said input tape;

a write channel for transferring edited data from said console means or recorded data from said input tape to said output tape for recordation thereon, said write channel including:

a second buffer connected to temporarily store recorded data from said input tape or edited data from said console means for transfer to said tape handling means for recordation on said output tape; and redundancy control means operationally connected to said second buffer for controlling the transfer of data stored in said buffer to said tape handling means, said transfer of data being repeated a selected number of times to produce redundant recordation of data on said output tape; and control panel means for controlling the transfer of data between said input tape, said console means, and said output tape.

7. The apparatus defined by claim 6 wherein each of said predetermined increments includes a selected plurality of data characters, said error detecting means including:

first means for detecting errors present in each of said data characters; and second means for detecting errors present in each of said predetermined increments.

8. The apparatus defined by claim 7 wherein data characters are recorded on said input tape as multibit binary words including a series of character bits and a recorded parity bit developed by summing said character bits, said first means including:

means for developing a check parity bit by summing a selected number of character bits applied thereto; and means for comparing said recorded parity bit to said check parity bit, a character error signal being provided in response to an unfavorable comparison.

9. The apparatus defined by claim 8 wherein said means for developing a check parity bit includes:

nary word representing several data bits and a recorded parity bit, said character detector circuit including:

means for generating a check parity bit for each of said binary words in response to the receipt of data bits forming a binary word; and means for comparing said check parity bit to said recorded parity bit, a character error signal being provided in response to an unfavorable comparison.

20. The apparatus defined by claim 19 said means for generating a check parity bit including:

a shift register connected to receive said data bits; and means operatively connected to said shift register for summing data bits forming a binary word and applied thereto from said shift register, a check parity bit being provided.

21. The apparatus defined by claim 20 wherein said predetermined increments each include a selected number of said multibit binary words, said bits having one of two binary levels, each said predetermined increment having associated therewith a recorded increment parity bit, said increment detector circuit including:

means for counting the number of bits having a selected one of said two binary levels and forming the binary words included in said predetermined increments, a check increment parity bit being provided; and means for comparing said check increment parity bit to said recorded increment parity bit, an increment error signal being provided as a result of an unfavorable comparison.

22. The apparatus defined by claim 21 wherein said write channel includes:

a write buffer for temporarily storing data transferred to said output tape for recordation; and redundancy means for controlling said recordation of data stored in said write buffer to be repeated a selected number of times.

23. The apparatus defined by claim 22 said control means including:

means for providing a character error indication in response to the application thereto of a character error signal; and means for providing an increment error indication in response to the application thereto of an increment error signal.

* * * * *